(12) United States Patent
Akiyama

(10) Patent No.: US 7,855,477 B2
(45) Date of Patent: Dec. 21, 2010

(54) APPARATUS FOR PREVENTING DISPLACEMENT OF RETAINER

(75) Inventor: Takanobu Akiyama, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 11/923,938

(22) Filed: Oct. 25, 2007

(65) Prior Publication Data

US 2008/0101737 A1 May 1, 2008

(30) Foreign Application Priority Data

Oct. 26, 2006 (JP) .............................. 2006-291015

(51) Int. Cl.
*H02K 41/00* (2006.01)
*H02K 41/02* (2006.01)

(52) U.S. Cl. .................... 310/12.01; 310/12.27; 310/22; 318/53

(58) Field of Classification Search ............... 310/12, 310/22, 12.01, 21.27; 318/53; *H02K 41/02, H02K 41/00*
See application file for complete search history.

(56) References Cited

U.S. PATENT DOCUMENTS

| | | | | |
|---|---|---|---|---|
| 4,997,552 | A | * | 3/1991 | Schlinkmann et al. ....... 209/552 |
| 5,208,497 | A | * | 5/1993 | Ishii et al. ...................... 310/12 |
| 5,606,206 | A | * | 2/1997 | Stephany et al. .............. 310/13 |
| 5,913,091 | A | * | 6/1999 | Nanba et al. ................... 399/32 |

(Continued)

FOREIGN PATENT DOCUMENTS

JP 05-049232 2/1993

(Continued)

OTHER PUBLICATIONS

JP 2004-116592__AB.pdf : Akiyama et al (JP 2004-116592, English abstract), 2004.*

(Continued)

*Primary Examiner*—Quyen Leung
*Assistant Examiner*—John K Kim
(74) *Attorney, Agent, or Firm*—DLA Piper LLP US

(57) ABSTRACT

There is provided an apparatus for preventing displacement of a retainer in a rolling guide by making use of the property of the retainer of moving half the distance of a moving object, such as a table. The apparatus for preventing displacement of a retainer in a guide apparatus having a plurality of finite rollers held by retainers and including a guide mechanism for guiding the movement of a moving object of a machine tool along guide surfaces of a bed or a saddle, and a linear motor feed mechanism for feeding the moving object, includes: a displacement regulator having a stopper for regulating the position of each retainer, the regulator being movable in conjunction of the movement of the moving object; a line of magnet plates of a linear motor for driving of the moving object, the line of magnetic plates being a constituent of a linear motor feed mechanism for the moving object and being arranged parallel to the guide surfaces; a linear motor mechanism for moving the displacement regulator in the same direction as the moving direction of the moving body; and a linear motor control means for moving the displacement regulator in synchronization with the movement of the moving object at a velocity which is one-half of the velocity of the moving object.

6 Claims, 2 Drawing Sheets

U.S. PATENT DOCUMENTS

| | | | |
|---|---|---|---|
| 6,986,654 B2* | 1/2006 | Imiolek et al. | 425/182 |
| 7,027,887 B2* | 4/2006 | Gaylo et al. | 700/117 |
| 7,073,442 B2* | 7/2006 | Fedor et al. | 101/480 |
| 7,425,783 B2* | 9/2008 | Sakiya | 310/12.22 |
| 2004/0003741 A1* | 1/2004 | Iskra et al. | 101/487 |
| 2005/0036126 A1* | 2/2005 | Kubo | 355/72 |
| 2008/0101737 A1* | 5/2008 | Akiyama | 384/49 |

FOREIGN PATENT DOCUMENTS

| | | |
|---|---|---|
| JP | 2004-116592 | 4/2004 |
| KR | 1020040027414 | 4/2004 |

OTHER PUBLICATIONS

English Language Translation of Office Action issued on Jul. 24, 2009 in Korean Application 10-2007-0107680.

Korean Office Action issued on Jul. 24, 2009 in Korean Application 10-2007-0107680.

English Language Abstract of KR Publication 1020040027414 published Apr. 1, 2004.

English Language Abstract of JP Publication 05-049232 published Feb. 26, 1993.

English Language Translation of JP Publication 05-049232 published Feb. 26, 1993.

* cited by examiner

APPARATUS FOR PREVENTING DISPLACEMENT OF RETAINER

BACKGROUND OF THE INVENTION

1. Field of the Invention

The present invention relates to a technique which is applicable to a rolling guide apparatus for guiding a moving object, such as a table, in a machine tool, in particular a guide apparatus of the type that employs finite rollers held by a retainer, and which can effectively prevent displacement of the retainer.

2. Background Art

Precision processing machines conventionally utilize rolling guides for guide of a moving object, such as a table or a saddle. Such rolling guides include the type of guide which uses a plurality of finite rollers held on a flat or V-shaped guide surface by means of a retainer.

A moving object on finite rollers is driven to move by a ball screw. Rolling guides using finite rollers, because of their low friction and high movement precision, are used as guides for ultra-precision feeding.

FIGS. 3 through 5 illustrate a change in the relative positions of retainers with respect to a moving object as observed when the object moves on rolling guides having finite rollers held by the retainers.

In particular, FIG. 3 shows the relative positions of retainers 1, 2 with respect to a table 3, a moving object, in a guide apparatus when the table 3 lies at the middle position of its stroke, and illustrates a case in which there is no displacement of the retainers 1, 2 with respect to the table 3. The retainers 1, 2 are provided on guide surfaces 5, 6 of a bed 4, and lie symmetrical with respect to the table 3 at this moment.

When a ball screw 7 is rotationally driven by a servomotor 8, the table 3, to which is secured a not-shown ball screw nut, moves to the right and left in the Figures. The retainers 1, 2 have the property of moving half the moving distance of the table 3 (for example, the retainers 1, 2 move 100 mm to the left when the table 3 moves 200 mm to the left).

When the movement of the table 3 is repeated, because of slight sliding due to friction with the finite rollers, the retainers 1, 2 become gradually displaced. A one-stroke movement of the table 3 will produce a displacement of e.g. about several µm. FIG. 4 illustrates a case in which the retainer 1 has been displaced to the right.

Such displacement gradually increases as the movement of the table 3 is repeated and, when the table 3 has a long stroke, it is possible that the table 3 may partly slide off the retainer 1 or 2, which could cause an accident. When the table 3 is heavy there is a case where the retainers 1, 2 do not slide between the bed 4 and the table 3, leading to buckling and breakage of the retainers 1, 2. The repair of a retainer needs a considerable time.

It is, therefore, a conventional practice to provide sensors 9a, 9b, 9c and 9d on both sides of the table 3 to detect partial sliding off of the table 3 from the retainer 1 or 2 and to carry out a position correction for a displaced retainer as shown in FIG. 5.

FIG. 5 is a top plan illustrating correction of the position of the retainer 1 carried out by moving the table 3 to the right and bringing the retainer 1 into contact with a stopper 10. As shown in FIG. 5, when the table 3 is moved to the right, the displaced retainer 1 comes into contact with the stopper 10 provided at the right end of the guide surface 5. A total of four stoppers 10 are provided at the longitudinal ends of the guide surfaces 5, 6. When the table 3 is further moved to the right with the retainer 1 kept in contact with the stopper 10, the retainer slides on the table 3 whereby the displacement is corrected.

The displacement correction method, which involves causing the displaced retainer 1 or 2 to collide against the stopper 10, may cause deformation of the retainer, thus adversely affecting the positioning accuracy, straightness, etc. of the machine.

Further, in view of the gradual increase in the displacement of retainers 1, 2 with the repetition of the movement of the table 3, it is a conventional practice to periodically carry out the position correction for the retainer 1 or 2 by contact of the retainer with the stopper 10, which requires needless wasted time. In addition, displacement of the retainers 1, 2 does not occur in a constant direction. This necessitates a troublesome operation of detecting a direction, in which displacement is to be corrected, with the sensors 9a, 9b, 9c and 9d, and determining the moving direction of the table 3 in carrying out the position correction of the displaced retainer 1 or 2.

In view of the above, the applicant has proposed a technique which prevents displacement of a retainer by making use of its property of moving half the moving distance of a table when the table moves (Japanese Patent Laid-Open Publication No. 2004-116592). The technique involves using a ball screw in addition to a ball screw for feeding of the table, reducing the rotating speed of the table-feeding ball screw to one-half and transmitting the torque to the other ball screw, and moving a case, to which a stopper for preventing displacement of the retainer is mounted, by means of the reduced-speed ball crew.

SUMMARY OF THE INVENTION

It is therefore an object of the present invention to provide a novel apparatus for preventing displacement of a retainer, which solves the above problems in the prior art, improves the conventional technique for preventing displacement of a retainer by utilizing its property of moving half the moving distance of a table, and can securely prevent a moving object from partly sliding off a retainer.

In order to achieve the object, the present invention provides an apparatus for preventing displacement of a retainer in a guide apparatus having a plurality of finite rollers held by retainers and including a guide mechanism for guiding the movement of a moving object of a machine tool along guide surfaces of a bed or a saddle, and a linear motor feed mechanism for feeding the moving object, comprising: a displacement regulator having a stopper for regulating the position of each retainer, said regulator being movable in conjunction of the movement of the moving object; a line of magnet plates of a linear motor for driving of the moving object, said line of magnetic plates being a constituent of a linear motor feed mechanism for the moving object and being arranged parallel to the guide surfaces; a linear motor mechanism for moving the displacement regulator in the same direction as the moving direction of the moving object; and a linear motor control means for moving the displacement regulator in synchronization with the movement of the moving object at a velocity which is one-half of the velocity of the moving object.

In a preferred embodiment of the present invention, the displacement regulator comprises the stoppers for contact with the front and rear ends of each retainer disposed on each guide surface, stopper holding members which hold the stoppers, and a structure for keeping the distance between the stoppers approximately the same as the length of the retainer and maintaining symmetry of all the stoppers.

According to the present invention, the displacement regulator can be moved at a velocity which is one-half of the velocity of a moving object, such as a table. This makes it possible to maintain constant relative positions of the retainers with respect to the moving object while regulating the positions of the retainers by the stoppers, thus securely preventing displacement of the retainers.

DESCRIPTION OF THE PREFERRED EMBODIMENT

A preferred embodiment of the present invention will now be described with reference to the drawings.

Figure 1:
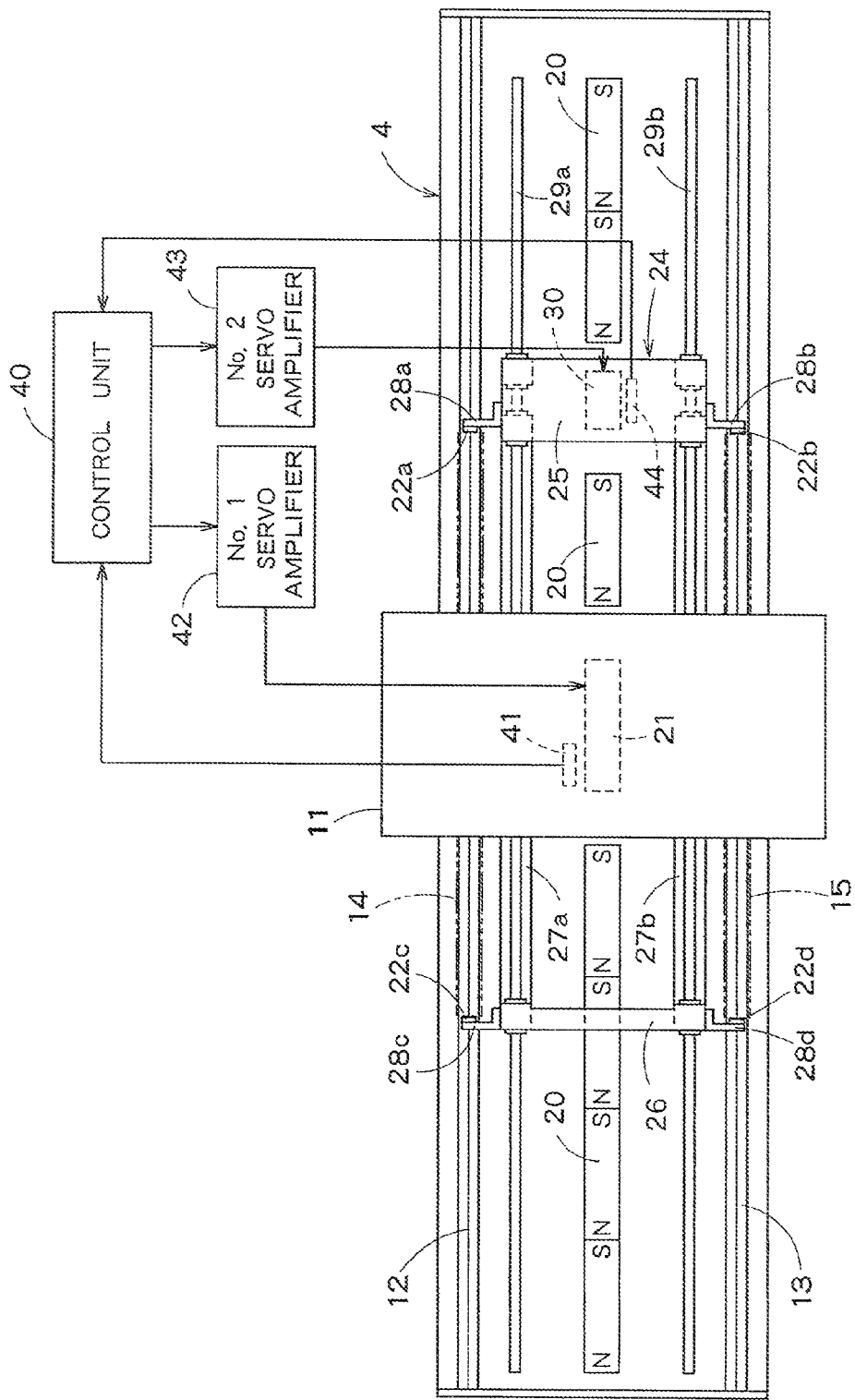
FIG. 1 is a plan view of an apparatus for preventing displacement of a retainer according to an embodiment of the present invention.

FIG. 1 is a plan view of an apparatus for preventing displacement of a retainer according to an embodiment of the present invention, which apparatus is applied to a feed guide apparatus for a table of a machine tool.

In FIG. 1, reference numeral 4 denotes a bed and reference numeral 11 denotes a table. The bed 4 has guide surfaces 12, 13 for guiding the movement of the table 11 in the long direction of the bed 4. A retainer 14, a constituent of a rolling guide, is laid on the guide surface 12, and a retainer 15 is laid on the guide surface 13.

Figure 2:
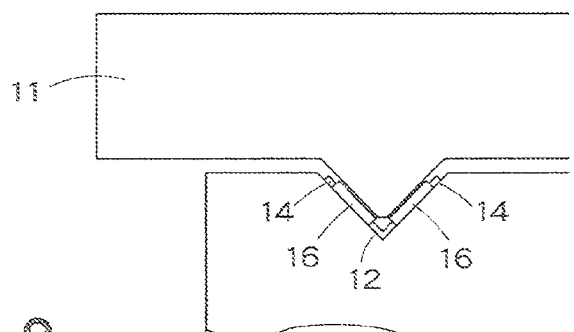
FIG. 2 is a diagram showing a guide surface to which the apparatus of FIG. 1 is applied.
Figure 3:
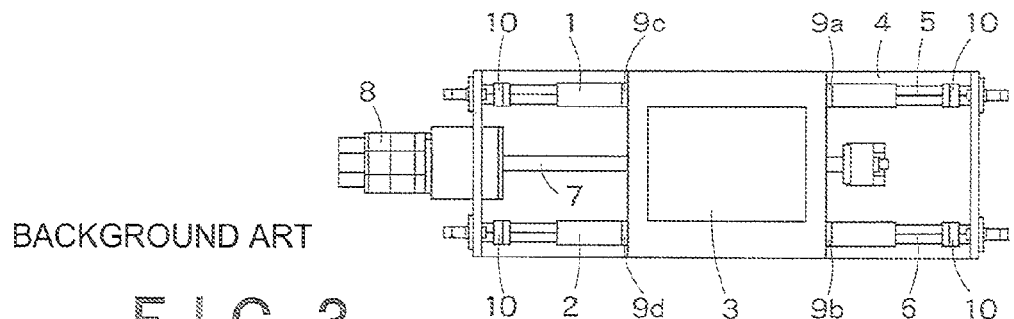
FIG. 3 is a diagram showing the relative position of a table with respect to retainers, illustrating a case in which there is no displacement of the retainers.
Figure 4:
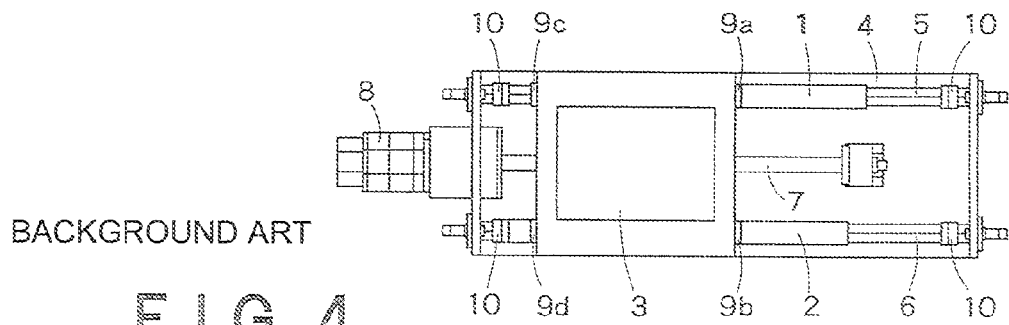
FIG. 4 is a diagram showing the relative position of the table with respect to the retainers, illustrating a case in which displacement of one of the retainers has occurred.
Figure 5:
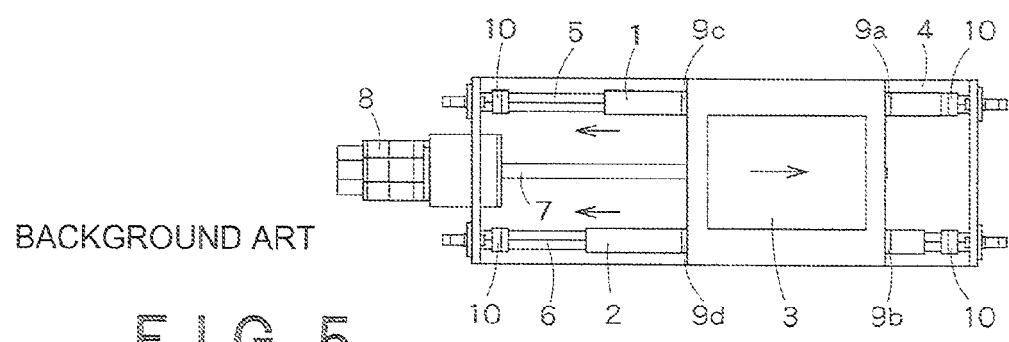
FIG. 5 is a diagram showing the relative position of the table with respect to the retainers, illustrating an operation for correcting the displacement of the retainer which has become displaced.

As shown in FIG. 2, in this embodiment the guide surfaces 12, 13 each have the shape of a V-shaped groove, and the both inclined surfaces of each groove serve as roller-rolling surfaces on which a large number of rollers 16 roll. The retainers 14, 15 are holders which each hold the rollers 16 in V-shaped lines conforming to the V-shaped groove.

The table 11 is carried on the rollers 16 held by the retainers 14, 15 and moves on the rollers 16 that roll on the roller-rolling surfaces of the V-shaped grooves. In this case, the retainers 14, 15 each move half the moving distance of the table 11 in the same direction as the moving direction of the table 11.

Though in this embodiment the guide surfaces 12, 13 each have the shape of a V-shaped groove, they may also be flat surfaces, or have the shape of an inverted V-shaped protrusion. Preferably, the roller-rolling surfaces of the guide surfaces 12, 13 have undergone lapping or scraping.

A description will now be made of a linear motor feed mechanism for feeding the table 11.

Referring to FIG. 1, magnet plates 20 are arranged in a line centrally in the upper surface of the bed 4 in the long direction of the bed 4, the line of magnet plates 20 constituting the stator of a linear motor. A mover 21 of the linear motor is mounted in the lower surface of the table 11.

In FIG. 1, reference numerals 22a to 22d denote stoppers for regulating the positions of the retainers 14, 15. The stoppers 22a to 22d are mounted to a displacement regulator 24 which moves in synchronization with the movement of the table 11.

In this embodiment the displacement regulator 24 includes a front movable board 25 and a rear movable board 26 respectively disposed forward and backward of the table 11. The front movable board 25 is coupled to the rear movable board 26 by elongated coupling members 27a, 27b.

The front movable board 25 and the rear movable board 26 are kept parallel to each other by the coupling members 27a, 27b, and the distance between the boards 25, 26 is approximately the same as the length of the retainers 14, 15. Stoppers 22a, 22b are mounted via brackets 28a, 28b to the left and right side surfaces of the front movable board 25. The stoppers 22a, 22b, by contact with the front ends of the retainers 14, 15, regulate the movements of the retainers. Similarly, stoppers 22c, 22d are mounted via brackets 28c, 28d to the left and right side surfaces of the rear movable board 26. The stoppers 22c, 22d, by contact with the rear ends of the retainers 14, 15, regulate the movements of the retainers.

Such displacement regulator 24 is guided by linear guides 29a, 29b extending parallel to the guide surfaces 12, 13 for the table 11. A linear motor mechanism is used to drive the movement of the displacement regulator 24. As the stator of the linear motor, the line of the magnet plates 20 that constitute the stator of the linear motor for driving the table 11, is shared with the table 11. The mover 30 of the linear motor mechanism for driving the displacement regulator 24 is mounted in the lower surface of the front movable board 25.

A description will now be made of a control unit for moving the displacement regulator 24 in synchronization with the movement of the table 11.

In FIG. 1, reference numeral 40 denotes a control section for the linear motor. The table 11 is provided with a linear encoder 41 for detecting the position of the table 11. A position detection signal outputted from the linear encoder 41 is introduced into the control section 40, while a position command signal from a not-shown NC apparatus is inputted into the control section 40. The control section 40 compares the position command signal with the feedback signal from the linear encoder 41 and outputs a command, which is to make the difference between the signals zero (0), to a first servo amplifier 42 for the table 11 so as to control the mover 21 of the linear motor which drives the table 11.

On the other hand, the displacement regulator 24 is provided with a linear encoder 44, and a position detection signal outputted from the linear encoder 44 is introduced into the control section 40. For a second servo amplifier 43 that drives the linear motor for the displacement regulator 24, the control section 40 performs control, synchronous with the linear motor for the table 11, by setting such parameters as to make the velocity of the displacement regulator 24 one-half of the velocity of the table 11 in order to make the moving distance of the displacement regulator 24 one-half of the moving distance of the table 11. Accordingly, in synchronization with the movement of the table 11, the displacement regulator 24 can constantly move at a velocity which is one-half of the velocity of the table 11 and thus can move half the moving distance of the table 11.

The operation of the retainer displacement preventing apparatus having the above-described construction will now be described.

The table 11, which is driven by the linear motor, moves to the right and left in FIG. 1. When the table 11 moves, the retainers 14, 15 move half the moving distance of the table 11 by the movements of the rolling rollers 16 held by the retainers 14, 15.

Simultaneously with the movement of the table 11, the displacement regulator 24 moves in the same direction as the moving direction of the table 11 at a velocity which is one-half of the velocity of the table 11 and consequently moves half the moving distance of the table 11.

Accordingly, the stoppers 22a, 22b, mounted via the brackets 28a, 28b to the front movable board 25 of the displacement regulator 24, move at the same velocity and in the same direction as the retainers 14, 15 while regulating the positions of the front ends of the retainers 14, 15. Therefore, the relative positions of the stoppers 22a, 22b with respect to the retainers 14, 15 remain unchanged. Similarly, the relative positions of the stoppers 22c, 22d, mounted to the rear movable board 26, with respect to the retainers 14, 15 remain unchanged.

With the constant relative positions, the stoppers 22a, 22c regulate the position of the retainer 14 in such a manner that they hold the front and rear ends of the retainer 14, and the stoppers 22b, 22d regulate the position of the retainer 15 in such a manner that they hold the front and rear ends of the retainer 15. Accordingly, the relative positions of the retainers 14, 15 with respect to the table 11 remain constant, that is, the retainers 14, 15 will not become displaced. This can eliminate the need to stop operation and carry out a position correction for a retainer as conventionally practiced. During one-stroke movement of the table 11, the retainers 14, 15 only undergo a resistance corresponding to several-μm displacement, and therefore will not become deformed.

Further according to this embodiment, the linear motor is used to drive the feed of the table 11 and, in addition, the linear motor is used for the drive mechanism that feeds the displacement regulator 24 at half the velocity of the velocity of the table 11. This offers the advantage of no need for a deceleration mechanism over the conventional apparatus that employs a ball screw feed mechanism which is driven by a servomotor and, in addition, also offers the following advantages:

In a ball screw feed mechanism, the ball screw forms a spring system, which lowers the movement precision of a table. In contrast, the use of a linear motor can achieve high movement precision. This makes it possible to perform with high precision the above-described control which makes the moving distance of the displacement regulator 24 one-half of the moving distance of the table 11.

Further, a ball screw mechanism requires the use of a lubricating oil. The lubricating oil can scatter onto a roller-rolling guide surface and adhere to the surface more than necessary, forming a thick oil film which may lower the movement precision. In contrast, with the use of a linear motor according to the present invention, there is no fear of lowering of movement precision due to adhesion of a lubricating oil to the roller-rolling surfaces of the guide surfaces 12, 13. This, coupled with enhancement of movement precision by lapping or scraping of the guide surfaces 12, 13, can provide a finite roller-type rolling guide best suited for a ultra-precision processing machine.

Further according to this embodiment, the line of magnet plates can be used as a common stator of linear motor both for the table 11 and for the displacement regulator 24, leading to smaller installation space and lowered cost of the apparatus.

While the present invention has been described with reference to the preferred embodiment that uses a table as a moving object, the present invention is also applicable to a guide apparatus for a saddle which moves on a table.

What is claimed is:

1. An apparatus for guiding the movement of a table of a machine tool along guide surfaces of a bed or a saddle, comprising:
   a plurality of rollers disposed along the guide surfaces;
   a plurality of retainers constructed and arranged to hold said rollers;
   a displacement regulator having at least one stopper contacting the retainers, said displacement regulator regulating the position of each of the retainers, said regulator being movable in conjunction with the movement of the table of the machine tool;
   a linear motor feed mechanism constructed and arranged to move the table on the plurality of rollers held by the retainers, said linear motor feed mechanism including a line of magnet plates fixed to the bed or saddle of the machine tool and arranged parallel to the guide surfaces;
   a linear motor mechanism constructed and arranged to move the displacement regulator in the same direction as the moving direction of the table; and
   a linear motor controller constructed and arranged to control said linear motor mechanism to move the displacement regulator in synchronization with the movement of the table at a velocity which is one-half of the velocity of the table.

2. The apparatus according to claim 1, wherein the linear motor mechanism shares the line of magnet plates with the linear motor feed mechanism which moves the table.

3. The apparatus according to claim 1, wherein the displacement regulator includes a plurality of the stoppers which contact front and rear ends of each retainer disposed on each guide surface, the displacement regulator also including brackets which hold the stoppers, and a movable board for keeping the distance between the stoppers approximately the same as the length of the retainer and maintaining symmetry of all the stoppers.

4. The apparatus according to claim 1 further comprising a linear guide for guiding the displacement regulator parallel to said guide surfaces.

5. The apparatus according to claim 1, wherein the guide surfaces are flat surfaces or have the shape of a V-shaped groove or an inverted V-shaped protrusion.

6. The apparatus according to claim 5, wherein the guide surfaces have undergone lapping or scraping.

* * * * *